US012397597B1

(12) United States Patent
McAllister (10) Patent No.: US 12,397,597 B1
(45) Date of Patent: Aug. 26, 2025

(54) REMOVABLE TIE-DOWN ANCHOR APPARATUS SYSTEMS AND METHODS

(71) Applicant: Weigh Safe, LLC, Lindon, UT (US)

(72) Inventor: Morgan McAllister, Lindon, UT (US)

(73) Assignee: Weigh Safe, LLC, Lindon, UT (US)

( * ) Notice: Subject to any disclaimer, the term of this patent is extended or adjusted under 35 U.S.C. 154(b) by 827 days.

(21) Appl. No.: 17/556,747

(22) Filed: Dec. 20, 2021

(51) Int. Cl.
 *B60D 1/28* (2006.01)
 *B60D 1/18* (2006.01)

(52) U.S. Cl.
 CPC ............... *B60D 1/28* (2013.01); *B60D 1/187* (2013.01)

(58) Field of Classification Search
 CPC . B60D 1/28; B60D 1/187; B60D 1/48; B60D 1/52; B60D 1/58
 See application file for complete search history.

(56) References Cited

U.S. PATENT DOCUMENTS

| | | | | |
|---|---|---|---|---|
| 8,215,658 B2* | 7/2012 | Stanifer | ................ | B60D 1/485 |
| | | | | 280/901 |
| 8,360,458 B2* | 1/2013 | Stanifer | ................ | B60D 1/485 |
| | | | | 280/495 |
| 9,522,583 B2* | 12/2016 | McCoy | ................ | B60P 7/0807 |
| 10,173,484 B2* | 1/2019 | McCoy | ................ | B60D 1/488 |
| 10,766,320 B2* | 9/2020 | McCall | ................ | B60D 1/583 |
| 10,850,580 B2* | 12/2020 | McCoy | ................ | B60D 1/58 |
| 2013/0193671 A1* | 8/2013 | McCoy | ................ | B60D 1/28 |
| | | | | 280/495 |
| 2021/0387492 A1* | 12/2021 | Ward | ................ | B60D 1/488 |

* cited by examiner

*Primary Examiner* — Valentin Neacsu
*Assistant Examiner* — Michael R Stabley
(74) *Attorney, Agent, or Firm* — Thorpe North & Western, LLP; David W. Osborne (57) ABSTRACT

Various removable tie-down anchor apparatuses and associated methods are described. In one example, a safety chain anchor apparatus can include a body member having an aperture and a latching member operable to be inserted into an elongate slot of the receiver, and a locking member movably coupled to an outside portion of the body member that allows the locking member to be in: an interference position that obstructs a portion of the aperture when the latching member is in the unlatched orientation, and an unobstructed position that substantially exposes the aperture when the latching member is in the latched orientation.

23 Claims, 8 Drawing Sheets

REMOVABLE TIE-DOWN ANCHOR APPARATUS SYSTEMS AND METHODS

FIELD OF THE INVENTION

The present invention relates generally to trailer hitch devices, systems, and associated methods. Accordingly, the present invention involves the mechanical arts field.

BACKGROUND OF THE INVENTION

There are many different types of trailer hitches that may be attached to a towing vehicle in a variety of ways, depending on the type of hitch. Some of the most common types of hitches include gooseneck, fifth wheel, front mount, and the like. Typically, trailers are connected to a towing vehicle by way of a ball hitch secured to the vehicle and a ball socket coupling mechanism on the trailer that mounts over the ball and thereby allows for the trailer to pivot behind the towing vehicle.

Additional trailer hitch accessories are often used with a trailer. These accessories can mount or secure to the trailer, such as safety chains, couplers, coupler locks, jacks, trailer lights, bearing protectors, winches and hitch balls. For example, safety chains can be utilized with a trailer. Safety chains provide an added safety measure by way of a secondary means of connection between the rear of the towing vehicle and the front of the trailer in case of separation of the ball hitch and ball socket. To be effective in the case of separation, assurance must be had that the safety chain will stay connected if the hitch fails. Accordingly, a safety chain can be secured between the trailer and an anchor within the towing vehicle to prevent the trailer from breaking away from the towing vehicle in the event that the hitch uncouples from the hitch ball.

SUMMARY OF THE INVENTION

A safety-chain anchor apparatus technology is provided. In one embodiment, a safety-chain anchor apparatus, which is removably securable within a receiver, can include a body member having an aperture and a latching member operable to be inserted into an elongate slot of the receiver. When inserted into the elongate slot of the receiver, the body member can be rotated in a first direction perpendicular to the receiver. Rotating the body member rotates the latching member to a latched orientation that is at least partially out of axial alignment with the elongate slot of the receiver. Rotating the body member in a second direction perpendicular to the receiver rotates the latching member to an unlatched orientation that is in axial alignment with the elongate slot of the receiver. The safety-chain anchor apparatus can also include a locking member that is movably coupled to an outside portion of the body member, which allows the locking member to be in: an interference position that obstructs a portion of the aperture when the latching member is in the unlatched orientation, and an unobstructed position that substantially exposes the aperture when the latching member is in the latched orientation.

In another embodiment, a removably securable safety-chain anchor apparatus can include a body member having an aperture and a latching member operable to be inserted into an elongate slot of the receiver. The body member can be inserted into the elongate slot of the receiver and rotated in a first direction perpendicular to the receiver, which rotates the latching member to a latched orientation that is at least partially out of axial alignment with the elongate slot of the receiver. The body member can be rotated in a second direction perpendicular to the receiver to rotate the latching member to an unlatched orientation that is in axial alignment with the elongate slot of the receiver. The safety-chain anchor apparatus can also include a locking member movably coupled to an upper rim of the body member that allows the locking member to vertically move between: an interference position that obstructs a portion of, or at least a portion of, the aperture when the latching member is in the unlatched orientation, and an unobstructed position that substantially exposes the aperture when the latching member is in the latched orientation.

In yet another embodiment, a safety-chain anchor apparatus, which is removably securable in a receiver, can include a body member with an aperture and a latching member operable to be inserted into an elongate slot of the receiver. When inserted into the receiver, the body member can be rotated in a first direction perpendicular to the receiver, which rotates the latching member to a latched orientation that is at least partially out of axial alignment with the elongate slot of the receiver. The body member can be rotated in a second direction perpendicular to the receiver to rotate the latching member to an unlatched orientation that is in axial alignment with the elongate slot of the receiver. The safety-chain anchor apparatus can also include a locking member pivotally coupled to a neck of the latching member to allow the body member to rotate within an arch structure of the locking member in an axial direction along an axis of the post, thereby allowing the locking member to be in: an interference position that obstructs a portion, or at least a portion, of the aperture when the latching member is in the unlatched orientation, and an unobstructed position that exposes, or substantially exposes, the aperture when the latching member is in the latched orientation.

DETAILED DESCRIPTION OF THE INVENTION

Definitions

In describing and claiming the present invention, the following terminology will be used in accordance with the definitions set forth below.

The singular forms "a," "an," and, "the" include express support for plural referents unless the context clearly dictates otherwise.

As used herein, the term "about" is used to provide flexibility to a numerical range endpoint by providing that a given value may be "a little above" or "a little below" the endpoint.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in this written description, like "comprising" or "including," it is understood that direct support should also be afforded to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The terms "coupled," or "connected" or like words as used herein, are defined as directly or indirectly connected in a mechanical or nonmechanical manner. Objects or structures described herein as being "adjacent to" each other may be in physical contact with each other, in close proximity to each other, or in the same general region or area as each other, as appropriate for the context in which the phrase is used. "Directly coupled" objects or elements are in direct contact with one another and are attached. In this written description, recitation of "coupled" or "connected" or variations of their respective root words, such as "coupling" or "connection" or "connecting," provides express support for "directly coupled" or "directly connected" and variations of their respective root words and vice versa.

Reference throughout this specification to "an example" means that a particular feature, structure, or characteristic described in connection with the example is included in at least one embodiment of the present invention. Thus, appearances of the phrases "in an example" or "an embodiment" in various places throughout this specification are not necessarily all referring to the same embodiment.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, the term "substantially" refers to the complete or nearly complete extent or degree of an action, characteristic, property, state, structure, item, or result. For example, an opening (e.g., a hole, an aperture, and the like) that is "substantially" exposed would mean that the opening is either completely exposed (e.g., free from obstructions) or nearly completely exposed. An opening that is "substantially" obstructed would mean that the opening is either completely obstructed or nearly completely obstructed so as to prevent an object from being inserted through the opening. The exact allowable degree of deviation from absolute completeness may in some cases depend on the specific context. The use of "substantially" is equally applicable when used in a negative connotation to refer to the complete or near complete lack of an action, characteristic, property, state, structure, item, or result. As used in this written description, express support for items or actions used with the term "substantially" is also afforded to the item or action without the term "substantially." For example, the terms "substantially closed" also provides express support for the term "closed".

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Invention Embodiments

Described herein are example embodiments for a removable tie-down anchor apparatus or assembly, which can also be referred to as a safety-chain anchor, safety-chain attachment, or puck system. Typically, safety chains are used between a towing vehicle and a trailer as a redundant mechanism to avoid trailer detachment in the event that the primary connection between the towing vehicle and trailer fails. Most trailer attachment mechanisms involve a hitch receiver, a ball mount, and a ball. The hitch receiver is attached to the frame of the towing vehicle, the ball mount attaches to the hitch receiver, and the ball attaches to the ball mount. The ball couples to the tongue of the trailer. Several types of towing systems or assemblies can be used depending on the size and weight of trailer to be pulled. For lower weight or profile trailers, the hitch receiver is mounted underneath the towing vehicle and the ball and ball mount extend out behind the towing vehicles rear bumper. For heavier or higher profile trailers, a more robust towing system or assembly, such as a $5^{th}$ wheel or gooseneck arrangement can be used. $5^{th}$ wheel and gooseneck systems attach to the frame of the towing vehicle (typically a truck) closer to the middle of the towing vehicle and extend up through the bed of the vehicle.

In the case of a hitch system or assembly that extends behind the rear bumper of the towing vehicle, openings or loops are typically provided which can be engaged by the safety chains. When $5^{th}$ wheel or gooseneck system or assembly is used which protrudes through the middle of a truck bed, it is inconvenient to have permanently positioned loops provided as they can hinder the use of the truck bed when a trailer is not being towed. Therefore, it has become common in the towing industry to utilize a socket arrangement to temporarily allow attachment of loops or other safety chain receiving structures to the hitch receiver. Such devices have become known in the towing industry as "safety chain anchors," "chain anchors," or "pucks". Through the use of a socket with an opening that is substantially flush with a truck bed, the chain anchors can be attached and then removed when not in use in order to maximize the benefit of the truck bed utility. While such anchors can be used with safety chains to secure the safety chains of a trailer to the towing vehicle, the anchors can also present other advantages with respect to restraining cargo or tying down other items in the bed of a truck during transport.

Figure 1:
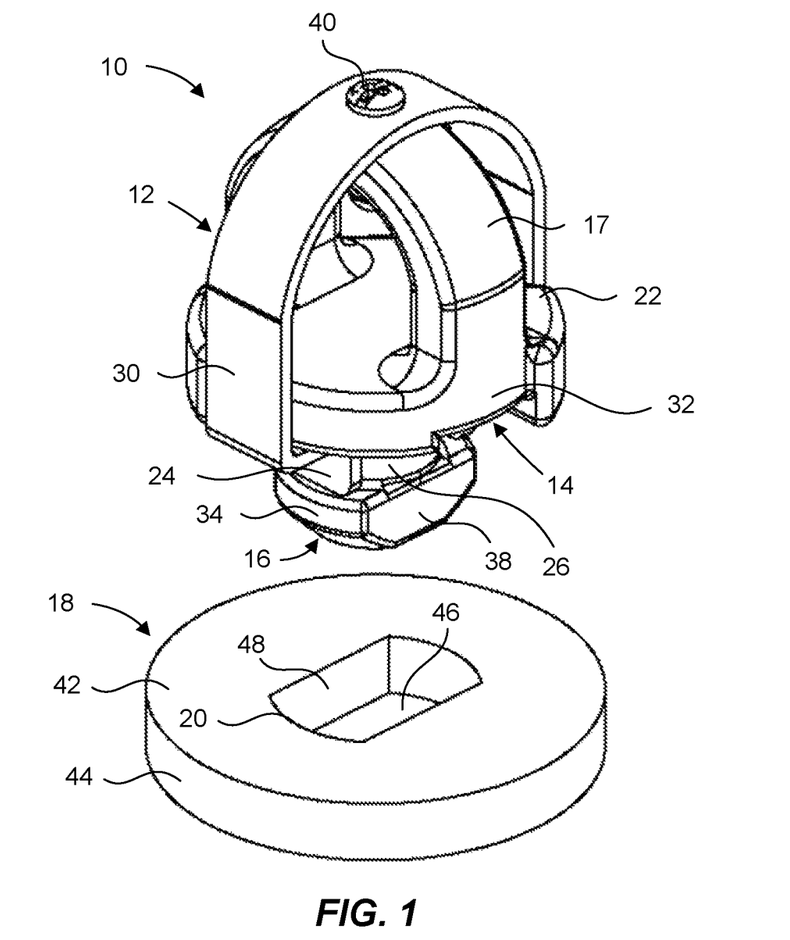
FIG. 1 illustrates a perspective view of a removable tie-down anchor apparatus, in accordance with an example of the present disclosure.
Figure 2:
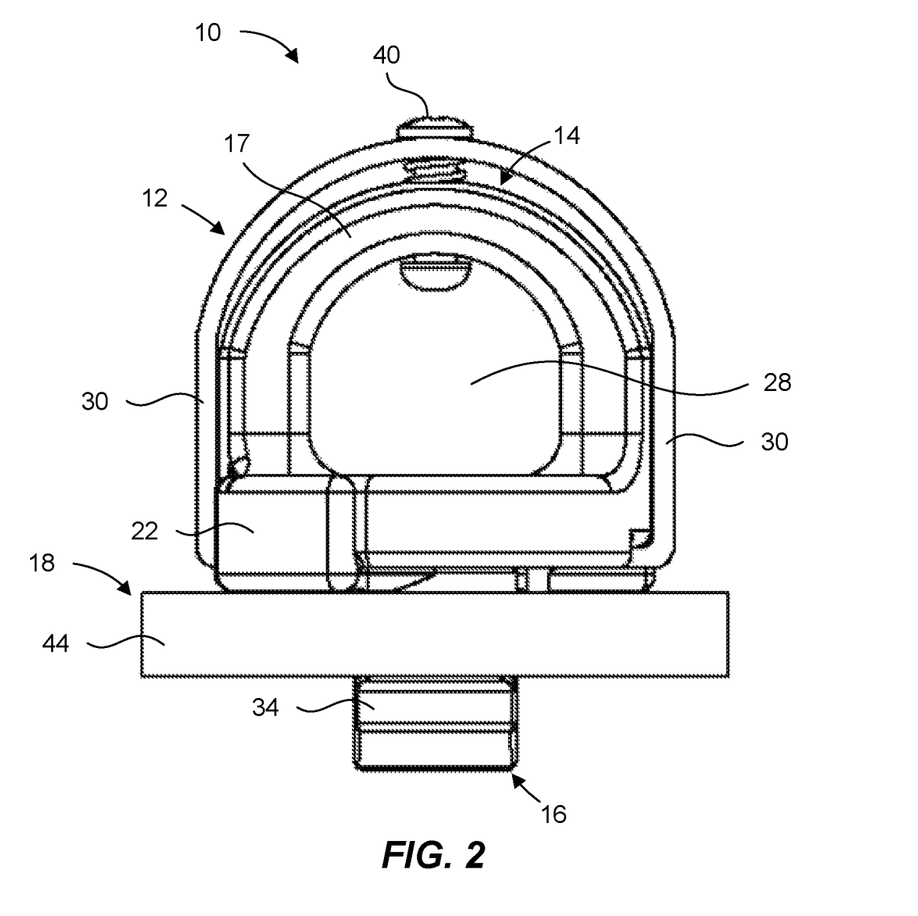
FIG. 2 is a side view of the removable tie-down anchor of FIG. 1.

Referring to FIGS. 1 and 2, illustrated is an example of a removable tie-down anchor apparatus or assembly. The tie-down anchor apparatus can comprise a tie-down anchor 10 (or safety-chain anchor) and a receiver 18. As will be appreciated, the receiver 18 illustrated in the figures may be a portion of a receiver configured for a tie-down anchor. As previously mentioned, in some embodiments, the receiver 18 can be connected to a hitch receiver or mount that is coupled to the frame of a towing vehicle and be oriented substantially flush with the bed of the towing vehicle (e.g. a truck bed) (not shown). The tie-down anchor 10 can include: a body member 14, a latching member 16 capable of being inserted into an elongate slot 20 of the receiver 18, and a locking member 12 pivotally connected to a post or neck 26 of the body member 14. The latching member 16 may extend downward from a base 32 of the body member 14, and may include a neck 26 and an enlarged head 38 formed from first and second opposingly directed flanges 34 projecting radially outward from the neck 26 at a lower end thereof. The latching member 16 can be adapted to selectively secure the tie-down anchor apparatus 10 to the receiver 18 upon rotation of the body member 14 to a latched orientation relative to the receiver 18 such that the flanges 34 of the enlarged head 38 of the latching member 12 extend under the elongated slot 20 of the receiver 18.

The locking member 12 can comprise an arch shape structure that allows the body member 14 to rotate within the locking member 12 in an axial direction along an axis of the neck 26 of the body member 14. As illustrated, the body member 14 is formed to include an aperture 28, closed loop, or coupling member that can be aligned with the locking member 12 (via rotation of the body member 14) to enable a safety chain or other tie down strap or restraining device (not shown) to be attached, so as to extend through aperture 28 and in some embodiments, encircle both the body member 14 and the locking member 12, thereby substantially preventing rotation of the body member 14 (including rotation back to, or substantially back to an original position) within the locking member 12 and effectively locking the tie-down anchor 10 to the receiver 18.

The locking member 12 may include one or more legs 24 that are insertable within the elongate slot 20 of the receiver 18 to prevent the locking member 12 from rotating, to an appreciable degree, relative to the receiver 18, while allowing the body member 14 to be rotated within the locking member 12 and the receiver 18. In one example, a fastener 40 can be laterally inserted through a top portion of the locking member 12 and the coupling member forming the aperture 28 of the body member 14. The fastener 40 can provide a second coupling point of the locking member 12 to the body member 14.

As mentioned above, the receiver 18 can include an elongated slot 20, which may be generally rectangular shaped formed through the center and across a diameter of a cover plate 42 so that the portions of the cover plate 42 extending from a sidewall 44 to the elongated slot 20 form inwardly projecting lips or shoulders running along the length of the elongated slot 20 on opposite sides thereof. The length of the elongated slot 20 is greater than its width, and the elongated slot 20 opens to a pocket 46. The sidewall 44 of the receiver 18 surrounds the receiver pocket 46.

When inserted into the elongate slot 20 of the receiver 18, the body member 14 can be rotated in a first direction perpendicular to the receiver 18 causing the latching member 16 to move to a latched orientation that is at least partially out of axial alignment with the elongate slot 20 of the receiver 18. When in the latched orientation, the arms 30 of the locking member 12 are aligned with a coupling member 17 of the body member 14 to substantially expose the aperture 28 of the body member 14. When the locking member 12 and the body member 14 are aligned, a safety chain can be coupled to the tie-down anchor apparatus 10 through the aperture 28 of the body member 14 to encircle both the locking member 12 and the body member 14, thereby locking the body member 14 to the locking member 12, and preventing the body member 14 from rotating to the unlatched orientation.

When the tie-down anchor apparatus 10 is in the latched orientation, rotating the body member 14 in a second direction perpendicular to the receiver 18 rotates the latching member 16 to an unlatched orientation that is in axial alignment with the elongate slot 20 of the receiver 18, thereby allowing the latching member 16 to be removed from the receiver 18.

In one example, the body member 14 can include a stop-tab 22 that extends horizontally from the body member 14 that, when in the latched orientation, engages the locking member 12 and prevents further rotation of the body member 14 in the first direction. As such, the stop-tab 22 provides a safety feature to prevent over-rotation of the body member 14 (e.g., more than 90 degrees) past an arm 30 of the locking member 12.

Figure 3:
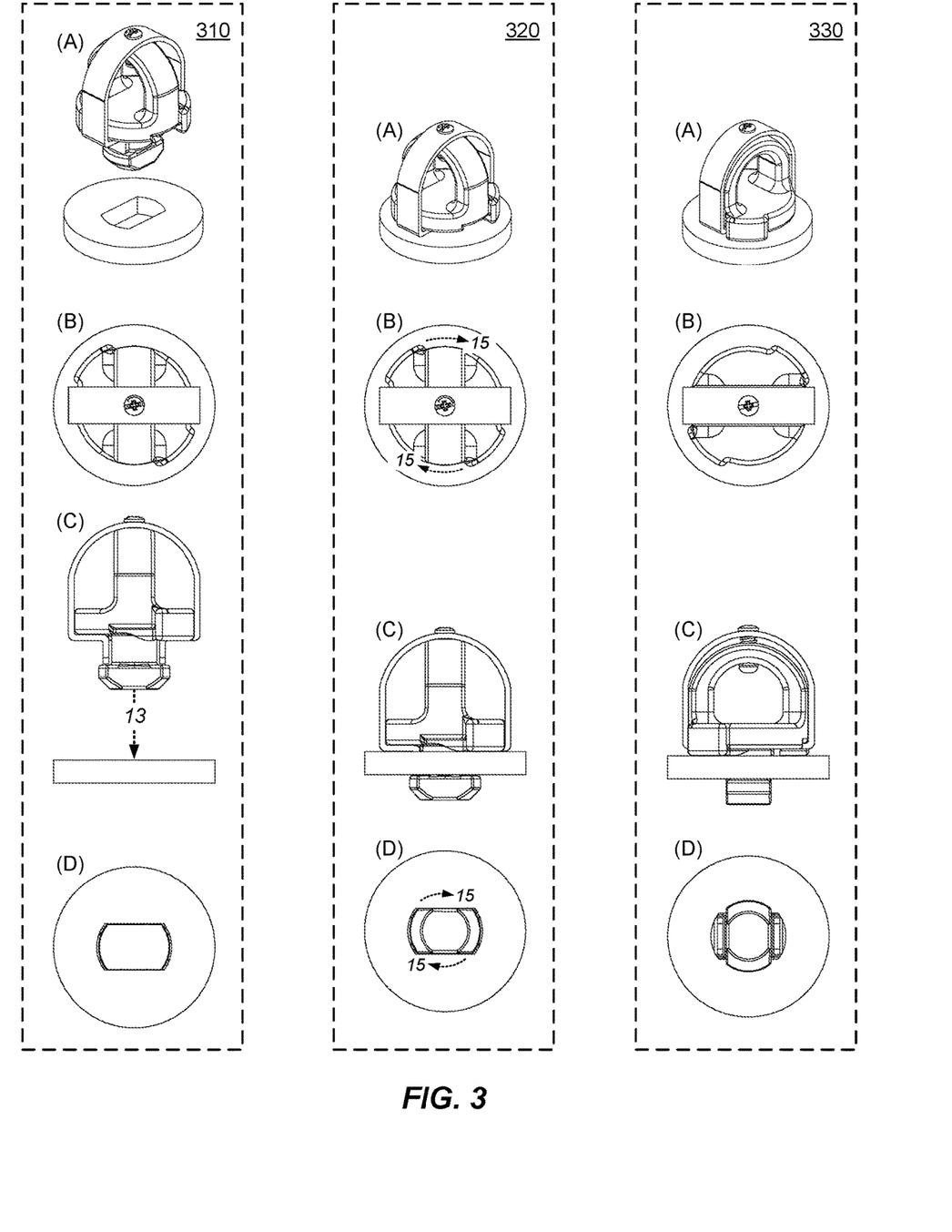
FIG. 3 illustrates aspects of a method for securing the tie-down anchor to the receiver of FIG. 1.

FIG. 3 illustrates aspects of a method for removably securing the tie-down anchor 10 (or safety-chain anchor) to the receiver 18, which were described earlier in reference to FIGS. 1-2. FIG. 3 shows multiple views of the tie-down anchor 10 and receiver 18, which illustrate the various orientations of the tie-down anchor 10 used to secure the tie-down anchor 10 to the receiver 18. Specifically, FIG. 3(A) is a perspective view of the tie-down anchor 10 and receiver 18. FIG. 3(B) is a top view of the tie-down anchor 10 and receiver 18. FIG. 3(C) is a side view of the tie-down anchor 10 and receiver 18. FIG. 3(D) is a bottom view of the tie-down anchor 10 and receiver 18.

With continuing reference to FIGS. 1 and 2, inserting and locking the tie-down anchor 10 to the receiver 18 may include the method steps illustrated in FIG. 3. The method can include: orienting the body member 14 for insertion into the receiver 18, inserting the latching member 16 into the elongate slot 20 of the receiver 18, and rotating the body member 14 to a latched orientation that engages the latching member 16 with a bottom surface of the receiver.

For example, as shown in FIG. 3-310(A), the body member 14 can be oriented within the arms 30 and arch structure of the locking member 12 so that the locking member 12 is in an interference position that obstructs a portion of the aperture 28 of the body member 14. For example, if not already in the interference position, the body member 14 can be rotated in a first direction perpendicular to the receiver 18 until a stop-tab 22 extending horizontally from the body member 14 engages an arm 30 of the locking member 12, which prevents the body member 14 from further rotation in the first direction, and places the body member 14 in the interference position. When in the interference position, the arms 30 of the locking member 12 may be crosswise or diagonal to the coupling member 17 of the body member 14, as shown in FIG. 3-310(B).

Orienting the body member 14 to be in the interference position places the latching member 16 in an unlatched orientation such that the length of the latching member 16 is in alignment with the length of the elongate slot 20 in the receiver 18, and the leg(s) 24 of the locking member 12 are in alignment with the flanges 34 of the latching member 16. This alignment allows the latching member 16 to pass through the elongate slot 20 and into the pocket 46 of the receiver 18, and allows the leg(s) 24 of the locking member 12 to engage a sidewall 48 of the elongate slot 20 fixing the locking member 12 in the receiver 18.

After orienting the tie-down anchor 10 as described above, the tie-down anchor 10 can be inserted into the receiver 18. More specifically, as shown in FIG. 3-310(C), the latching member 16 can be inserted in a downward direction 13 into the pocket 46 of the receiver 18 so that the enlarged head 38 of the latching member 16 is within the pocket 46 of the receiver 18 and the neck 26 of the latching member 16 and the leg(s) 24 of the locking member 12 are seated in the elongate slot 20 of the receiver 18. Inserting the latching member 16 into the receiver 18 engages the leg(s) 24 of the locking member 12 with the elongate slot 20 of the receiver 18 and fixes the position of the locking member 12 relative to the elongate slot 20 while allowing the body member 14 to rotate within both the arch structure of the locking member 12 and the elongate slot 20 of the receiver 18 between a latched orientation and unlatched orientation.

Having inserted the tie-down anchor 10 into the receiver 18, the tie-down anchor 10 can be secured to the receiver 18 by placing the latching member 16 in a latched orientation. This is accomplished by rotating the body member 14 within the arms 30 of the locking member 12 in a first direction 15 to align the aperture 28 of the body member 14 with an opening of the arch structure of the locking member 12, so that the aperture 28 is substantially unobstructed by the arms 30 of the locking member 12, as shown in FIG. 3-330(C). Rotating the body member 14 in the first direction 15 rotates the enlarged head 38 of the latching member 16 so that the enlarged head 38 is at least partially out of axial alignment with the elongate slot 20 of the receiver 18, as shown in FIG. 3-330(D).

In one example, the body member 14 can include a stop-tab 22 that extends horizontally from the body member 14. When rotating the body member 14 to the latched orientation, the stop-tab 22 engages an arm 30 of the locking member 12 which prevents further rotation of the body member 14 in the first direction. The stop-tab 22 can be positioned on the body member 14 to ensure alignment of the latching member 16 in a latched orientation that is at least partially out of axial alignment with the elongate slot 20 of the receiver 18. When in the latched orientation, the flanges 34 of the enlarged head 38 of latching member 12 extend under the elongated slot 20 of the receiver 18 so as to prevent removal of the tie-down 10 from the receiver 18, as shown in FIG. 3-330(D).

When the tie-down anchor 10 is in the latched orientation, coupling a safety chain (not shown) to the tie-down anchor 10 can include coupling the safety chain through the aperture 28 of the body member 14 to encircle both an arm 30 of the locking member 12 and a coupling member 17 of the body member 14, thereby locking the body member 14 to the locking member 12, and preventing the body member 14 from rotating in a second direction to an unlatched orientation. Illustratively, a closed loop on the safety chain could be attached, or some other structure adapted, to be securely encircle both the body member 14 and the locking member 12.

Figure 4:
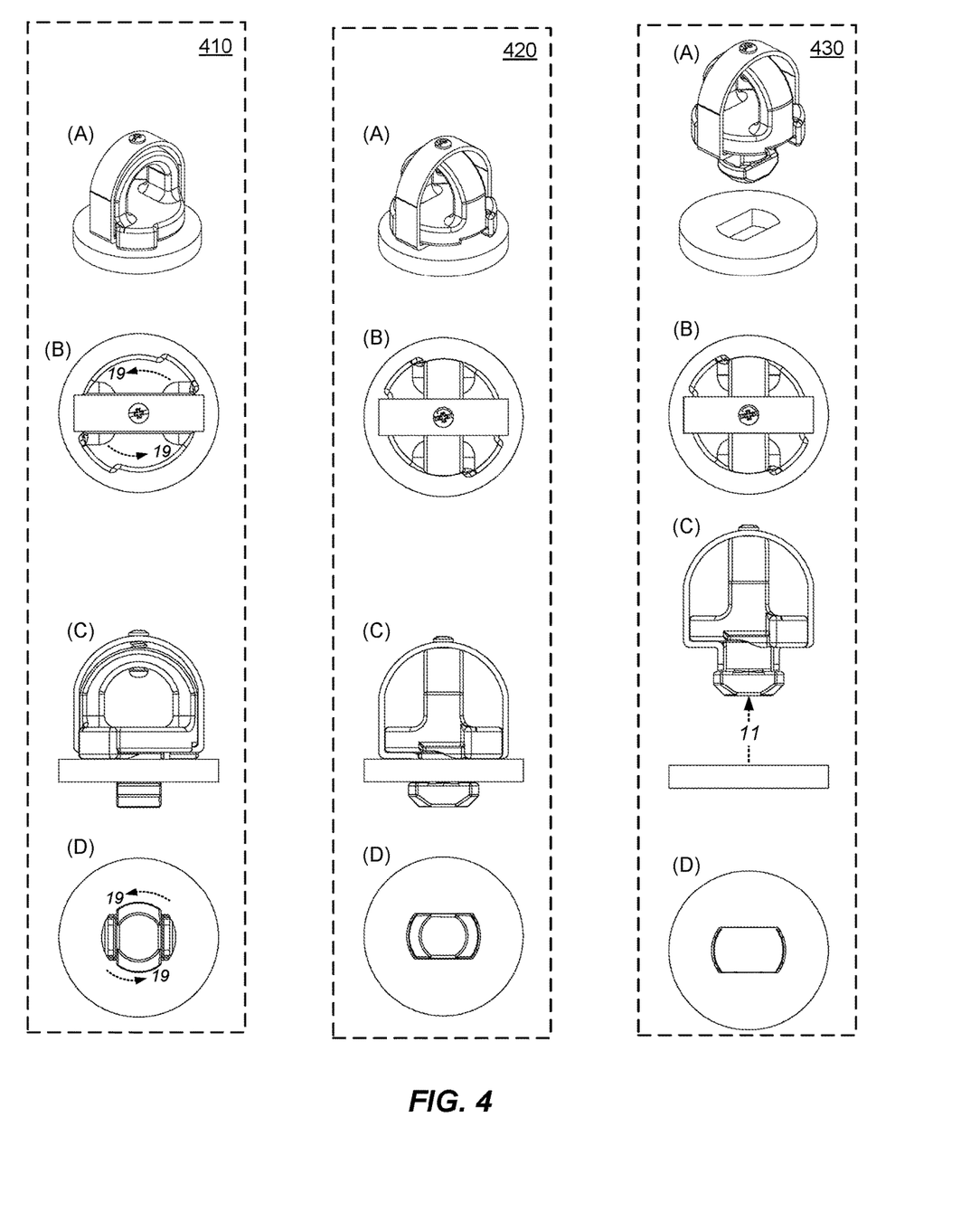
FIG. 4 illustrates aspects of a method for removing the tie-down anchor from the receiver of FIG. 1.

FIG. 4 illustrates aspects of a method for removing the tie-down anchor 10 (or safety-chain anchor) from the receiver 18. FIG. 4 shows multiple views of the tie-down anchor 10 and receiver 18 to illustrate the various orientations of the tie-down anchor 10 used to unsecure the tie-down anchor from the receiver 18. Specifically, FIG. 4(A) is a perspective view of the tie-down anchor 10 and receiver 18. FIG. 4(B) is a top view of the tie-down anchor 10 and receiver 18. FIG. 4(C) is a side view of the tie-down anchor 10 and receiver 18. FIG. 4(D) is a bottom view of the tie-down anchor 10 and receiver 18.

With continuing reference to FIGS. 1 and 2, removing the tie-down anchor 10 from the receiver 18 may include the method steps illustrated in FIG. 4. The method may begin by uncoupling a safety chain (not shown) that encircles both an arm 30 of the locking member 12 and a coupling member 17 of the body member 14. Uncoupling the safety chain from the tie-down anchor 10 unlocks the locking member 12 from the body member 14 and allows the body member 14 to be rotated in a second direction 19 to an unlatched orientation.

Accordingly, after uncoupling the safety chain, the tie-down anchor 10 can be removed from the receiver 18 by first rotating the body member 14 in the second direction 19 perpendicular to the receiver 18, as shown in FIG. 4-410(B), which rotates the enlarged head 38 of the latching member 12 to an unlatched orientation that is in axial alignment with the elongate slot 20 of the receiver 18, as shown in FIG. 4-420(D). When in axial alignment with the elongate slot 20 of the receiver 18, the flanges 34 of the enlarged head 38 are unobscured and can pass through the elongate slot 20 of the receiver 18. Also, rotating the body member 14 in the second direction 19 places the body member 14 in an interference position that obstructs a portion of the aperture 28, as shown in FIG. 4-420(C). When in the interference position, the arms 30 of the locking member 12 may be crosswise or diagonal to the coupling member 17 of the body member 14, as shown in FIG. 4-420(B).

In one example, the body member 14 can include a stop-tab 22 that extends horizontally from the body member 14. When rotating the body member 14 in the second direction 19 from the latched orientation to the unlatched orientation, the stop-tab 22 engages an arm 30 of the locking member 12 when the body member 14 reaches the unlatched orientation, as shown in FIG. 4-420(B).

After placing the body member 14 in the interference position shown in FIG. 4-420(C), the enlarged head 38 is oriented to pass through the elongate slot 20 of the receiver 18, as shown in FIG. 4-420(D). Accordingly, the tie-down anchor 10 can be lifted in an upward direction 11 relative to the receiver 18, as shown in FIG. 4-430(C), thereby removing the tie-down anchor 10 from the receiver 18.

Figure 5:
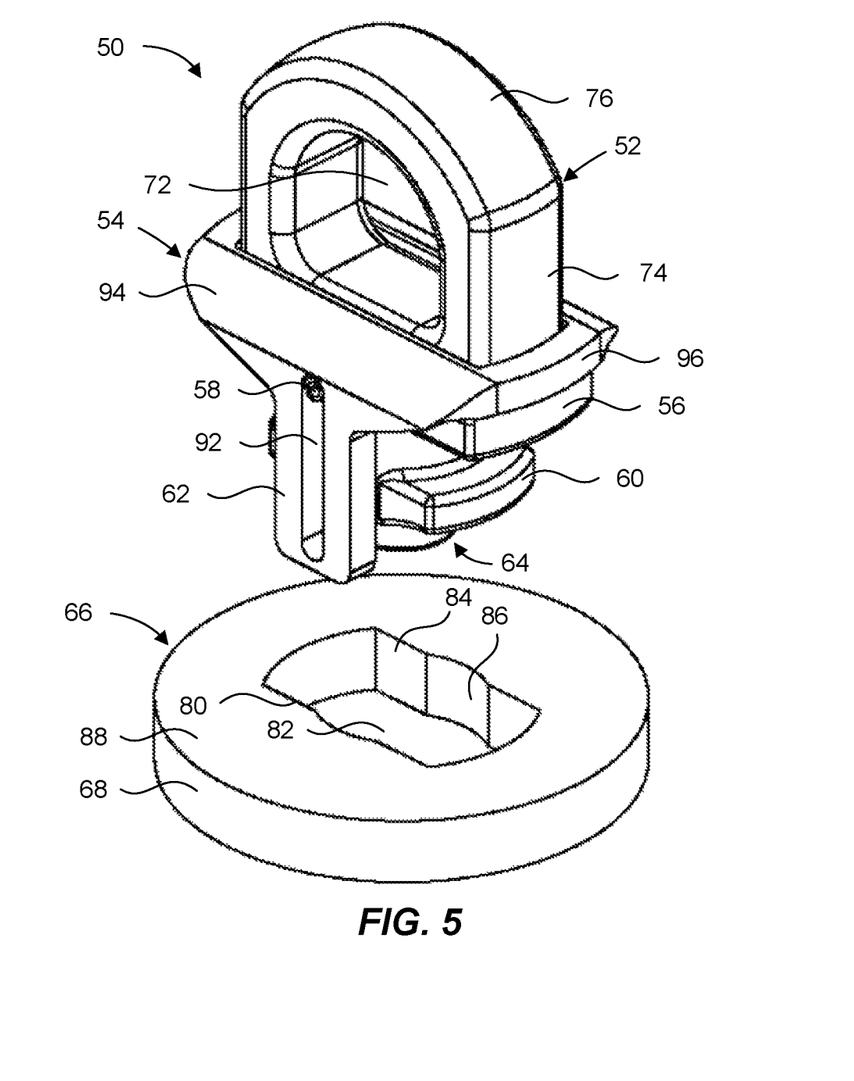
FIG. 5 illustrates a perspective view of removable tie-down anchor apparatus, in accordance with another example of the present disclosure.
Figure 6:
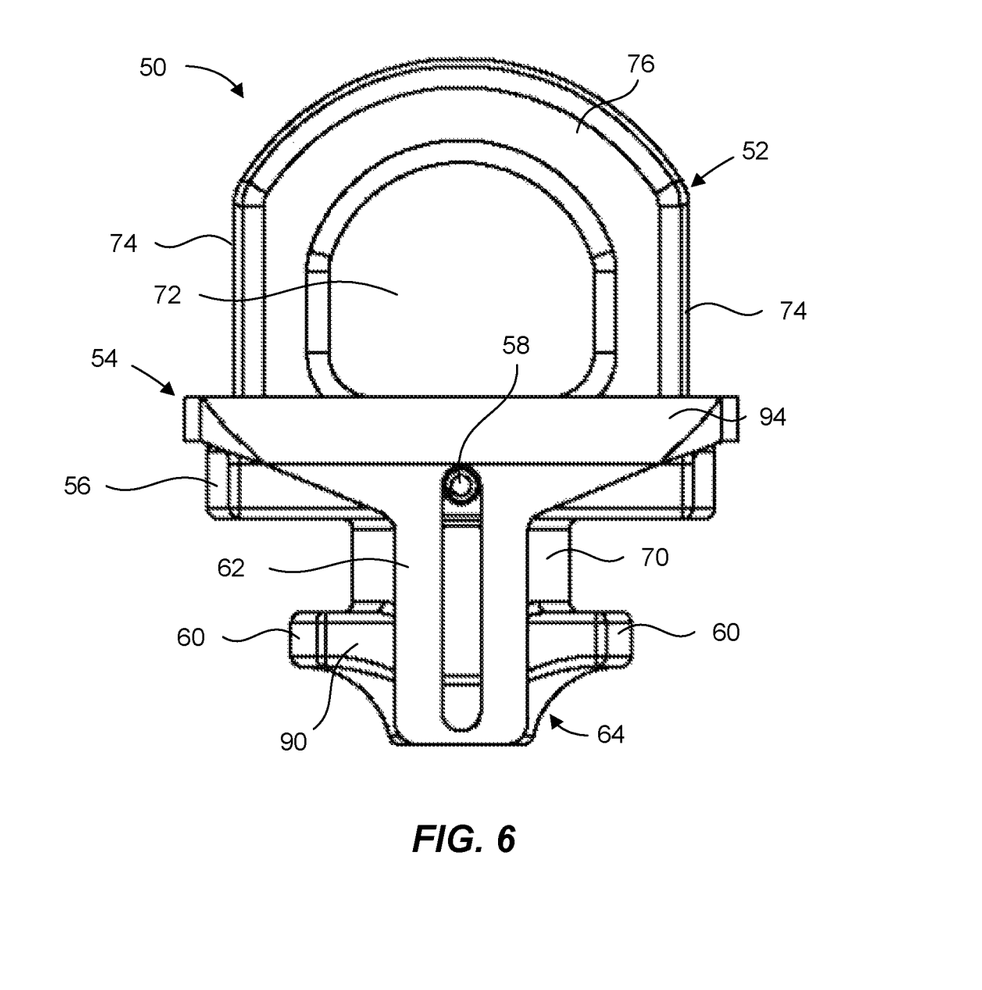
FIG. 6 is a side view of the removable tie-down anchor of FIG. 5.

Referring now to FIGS. 5 and 6, illustrated is another example of a removable tie-down anchor apparatus or assembly. The tie-down anchor apparatus can comprise a tie-down anchor 50 (or safety-chain anchor) and a receiver 66. The tie-down anchor 50 can include: a body member 52, a latching member 64 capable of being inserted into an elongate slot 80 of the receiver 66, and a locking member 54 movably coupled to an upper rim 56 of the body member 52 to allow the locking member 54 to vertically move between an interference position that obstructs a portion of an aperture 72 of the body member 52 when the latching member 64 is in an unlatched orientation, and an unobstructed position that substantially exposes the aperture 72 when the latching member 64 is in an latched orientation. As illustrated, the body member 52 is formed to include an aperture 72, closed loop, or coupling member that enables a safety chain or strap or other tie down device (not shown) to be attached to the tie-down anchor 50. In one example, the tie-down anchor apparatus illustrated in FIGS. 5 and 6 may be configured for a particular make and model of vehicle, such as a RAM truck made by the Chrysler Corporation.

The latching member 64 may extend downward from the upper rim 56 of the body member 52, and may include a neck 70 and an enlarged head 90 formed from first and second opposingly directed flanges 60 projecting radially outward from the neck 70 at a lower end thereof. The latching member 64 can be adapted to selectively secure the tie-down anchor 50 to the receiver 66 upon rotation of the body member 52 to a latched orientation relative to the receiver 66, such that the flanges 60 of the enlarged head 90 of the latching member 64 extend under the elongated slot 80 of the receiver 66.

The locking member 54 can comprise a sliding component configured to slide in a vertical direction along an axis of the neck 70 of the latching member 64. The locking member 54 may be coupled to the upper rim 56 of the body member 52 using a fastener 58 inserted through an elongated groove 92 of the locking member 54. The elongated groove 92 may be generally rectangular shaped formed through the center and across a diameter of the leg 62 of the locking member 54. The elongated groove 92 and fastener 58 allows the locking member 54 to vertically slide a distance of the elongated groove 92 along the axis of the neck 70 of the latching member 64. Vertically sliding the locking member 54 along the axis of the neck 70 in an upward direction places the locking member 54 in the interference position that obstructs a portion of the aperture 72 of the body member 52, which interferes with coupling of a safety chain to the tie-down anchor 50. Vertically sliding the locking member 54 along the axis of the neck 70 in a downward direction places the locking member 54 in the unobstructed position that substantially exposes the aperture 72 of the body member 52, which allows a safety chain to be coupled to the tie-down anchor 50.

The locking member 54 can include a leg 62 extending downward from an interference bar 94 of the locking member 54. In one example, the locking member 54 can include a pair of interference bars 94, each having downward extending legs 62. A first interference bar may be situated on a first side of the body member 52, and a second interference bar may be situated on a second side of the body member 52 wherein the interference bars 94 may be connected at each end by connecting members 96 to create a space between the interference bars 94 that allows the locking member 54 to encircle the body member 52. When the locking member 54 is in the interference position, the interference bars 94 at least partially obstruct the aperture 72 of the body member 52.

As mentioned above, the receiver 66 can include an elongated slot 80, which may be generally rectangular shaped formed through the center and across a diameter of a cover plate 88 so that portions of the cover plate 88 extending from a sidewall 68 to the elongated slot 80 form inwardly projecting lips or shoulders 84 running along the length of the elongated slot 80 on opposite sides thereof. The elongated slot 80 can include notches 86 located on opposing sides of the shoulders 84 to allow the neck 70 of the latching member 64 to pass through the elongated slot 80. The length of the elongated slot 80 may be greater than its width, and the elongated slot 80 opens to a pocket 82. The sidewall 68 of the receiver 66 can surround the receiver pocket 82.

Inserting the latching member 64 into the elongate slot 80 of the receiver 66 engages the leg(s) 62 of the locking member 54 with a cover plate 88 of the receiver and forces the leg(s) 62 of the locking member 54 to move in an upward direction placing the locking member 54 in the interference position that obstructs the aperture 72 of the body member 52. After inserting the latching member 64 in the elongate slot 80 of the receiver 66 and forcing the locking member 54 in the interference position, the body member 52 can be rotated in a first direction to a latched orientation. When the body member 52 reaches the latched orientation, the leg(s) 62 of the locking member 54 fall vertically by gravity into a space of the elongate slot 80 of the receiver 66 causing the locking member 54 to fall in a downward direction into the unobstructed position that substantially exposes the aperture 72 of the body member 52. When the leg(s) 62 of the locking member 54 are engaged in the elongate slot 80 of the receiver 66, the leg(s) 62 prevent the body member 52 from rotating, to an appreciable degree, to an unlatched orientation. More specifically, the leg(s) 62 of the locking member 54 abut shoulders 84 of the elongated slot 80, such that there is not a sufficient amount of open space in the elongated slot 80 to allow the leg(s) 62 to rotate with the latching member 64 in the elongated slot 80 of the receiver 66.

When the tie-down anchor 50 is secured in the receiver 66 (i.e., the latching member 64 is in the latched orientation and the locking member 54 is in the unobstructed position), a safety chain (or other type of safety attachment) can be coupled to the tie-down anchor 50 by attaching the safety chain to the body member 52 (e.g., via a coupling member 76 and aperture 72). Attaching the safety chain to the coupling member 76 effectively locks the tie-down anchor 50 to the receiver 66. More specifically, attaching the safety chain to the coupling member 76 of the body member 52 obstructs the aperture 72 of the body member 52 and prevents the locking member 54 from moving, to an appreciable degree, in an upward direction that would allow the leg(s) 62 of the locking member 54 to exit the elongated slot 80 and allow the body member 52 to rotate to the unlatched orientation.

Conversely, removing the safety chain from the tie-down anchor 50 when the tie-down anchor 50 is secured to the receiver 66 effectively unlocks the locking member 54 and allows the tie-down anchor 50 to be removed from the receiver 66. More specifically, when the locking member 54 is in the unobstructed position and the aperture 72 is free from obstruction (e.g., the safety chain), lifting the exposed portion of the locking member 54 (e.g., the interference bars 94) in an upward direction disengages the leg(s) 62 of the locking member 54 from the elongate slot 80 of the receiver 66, which allows the body member 52 to be rotated in the second direction to the unlatched orientation, whereupon the tie-down anchor 50 can be removed from the receiver 66.

Figure 7:
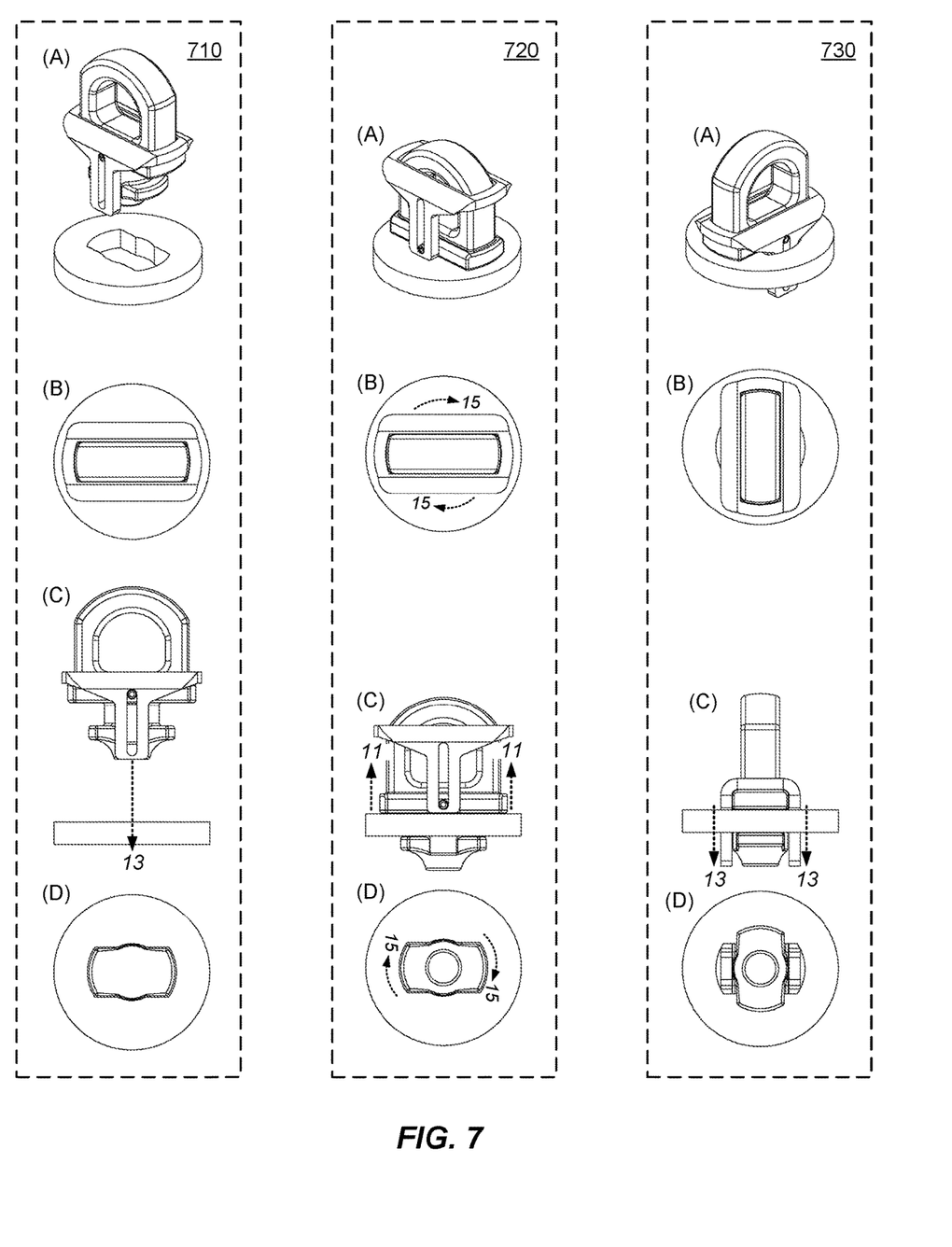
FIG. 7 illustrates aspects of a method for securing the tie-down anchor to the receiver of FIG. 5.

FIG. 7 illustrates aspects of a method for removably securing the tie-down anchor 50 (or safety-chain anchor) to the receiver 66 described above in reference to FIGS. 5-6. FIG. 7 shows multiple views of the tie-down anchor 50 and receiver 66, which illustrate the various orientations of the tie-down anchor 50 used to secure the tie-down anchor 50 to the receiver 66. Specifically, FIG. 7(A) is a perspective view of the tie-down anchor 50 and receiver 66. FIG. 7(B) is a top view of the tie-down anchor 50 and receiver 66. FIG. 7(C) is a side view of the tie-down anchor 50 and receiver 66. FIG. 7(D) is a bottom view of the tie-down anchor 50 and receiver 66.

With continuing reference to FIGS. 5 and 6, inserting and locking the tie-down anchor 50 to the receiver 66 may include the method steps illustrated in FIG. 7. The method can include: orienting the body member 52 for insertion into the receiver 66, inserting the latching member 64 into the elongate slot 80 of the receiver 66 to force the locking member 54 into the interference position, and rotating the body member 52 to a latched orientation that causes the leg(s) 62 of the locking member 64 to fall into the elongated slot 80 and placing the locking member 64 in unobstructed position that allows a safety chain to be attached to the tie-down anchor 50.

For example, as shown in FIG. 7-710(A), the tie-down anchor 50 can be oriented to align the flanges 60 of the latching member 64 with the elongated slot 80 of the receiver 66 so that the length of the enlarged head 90 corresponds to the length of the elongated slot 80. After orienting the latching member 64 with the elongated slot 80, the latching member 64 can be moved in a downward direction 13 to insert the latching member 64 into the elongated slot 80, as shown in FIG. 7-710(C).

When the latching member 64 is inserted into the elongated slot 80 of the receiver 66, the leg(s) 62 of the locking member 54 engages a top surface of the receiver 66 and forces the locking member 54 to move in an upward direction 11 and places the locking member 54 in an interference position that obstructs the portion of the aperture, as shown in FIG. 7-720(C). When in the interference position, the locking member 54 obstructs the aperture 75 of the body member 52 making it difficult to attach a safety chain to the tie-down anchor 50.

Having inserted the latching member 64 into the elongated slot 80 of the receiver 66, the tie-down anchor 50 can be rotated in a first direction 15, as shown in FIG. 7-720(B). Rotating the tie-down anchor 50 in the first direction causes the latching member 64 to also move in the first direction, as shown in FIG. 7-720(D), so that the flanges 60 of the enlarged head 90 of the latching member 64 extend under the elongated slot 80 of the receiver 66, as shown in FIG. 7-730(D).

When the tie-down anchor 50 reaches the latched orientation shown in FIG. 7-730, the leg(s) 62 of the locking member 54 fall vertically by gravity into the elongated slot 80 of the receiver 66, causing the locking member 54 to fall in a downward direction 13, as shown in FIG. 7-730(C), which places the locking member 54 into an unobstructed position that substantially exposes the aperture 72 of the body member 52, as shown in FIG. 7-730(A).

Also, as shown in FIG. 7-730(C), placing the locking member 54 into the unobstructed position engages the leg(s) 62 of the locking member 54 with the elongated slot 80 of the receiver 66. When engaged with the elongated slot 80, the leg(s) 62 are trapped within a space of the elongated slot 80 that prevents the body member 52 (and latching member 64) from rotating perpendicular to the receiver 66, to an appreciable degree, to an unlatched orientation. More specifically, the leg(s) 62 of the locking member 54 abut shoulders 84 of the elongated slot 80, such that there is not a sufficient amount of space in the elongated slot 80 to allow the leg(s) 62 to rotate with the latching member 64 within the elongated slot 80 of the receiver 66.

When the locking member 54 is in the unobstructed position that substantially exposes the aperture 72 of the body member 52, coupling a safety chain through the aperture 75 to a coupling member 76 of the body member 52 blocks the locking member 54 from moving in an upward direction that would place the locking member 54 in the interference position and prevents rotation of the body member 52 in the second direction to the unlatched orientation. For example, attaching the safety chain to the coupling member 76 of the body member 52 obstructs the aperture 72 with the safety chain and prevents the locking member 54 from moving, to an appreciable degree, in an upward direction that would allow the leg(s) 62 of the locking member 54 to exit the elongated slot 80 and allow the body member 52 to rotate to the unlatched orientation.

Figure 8:
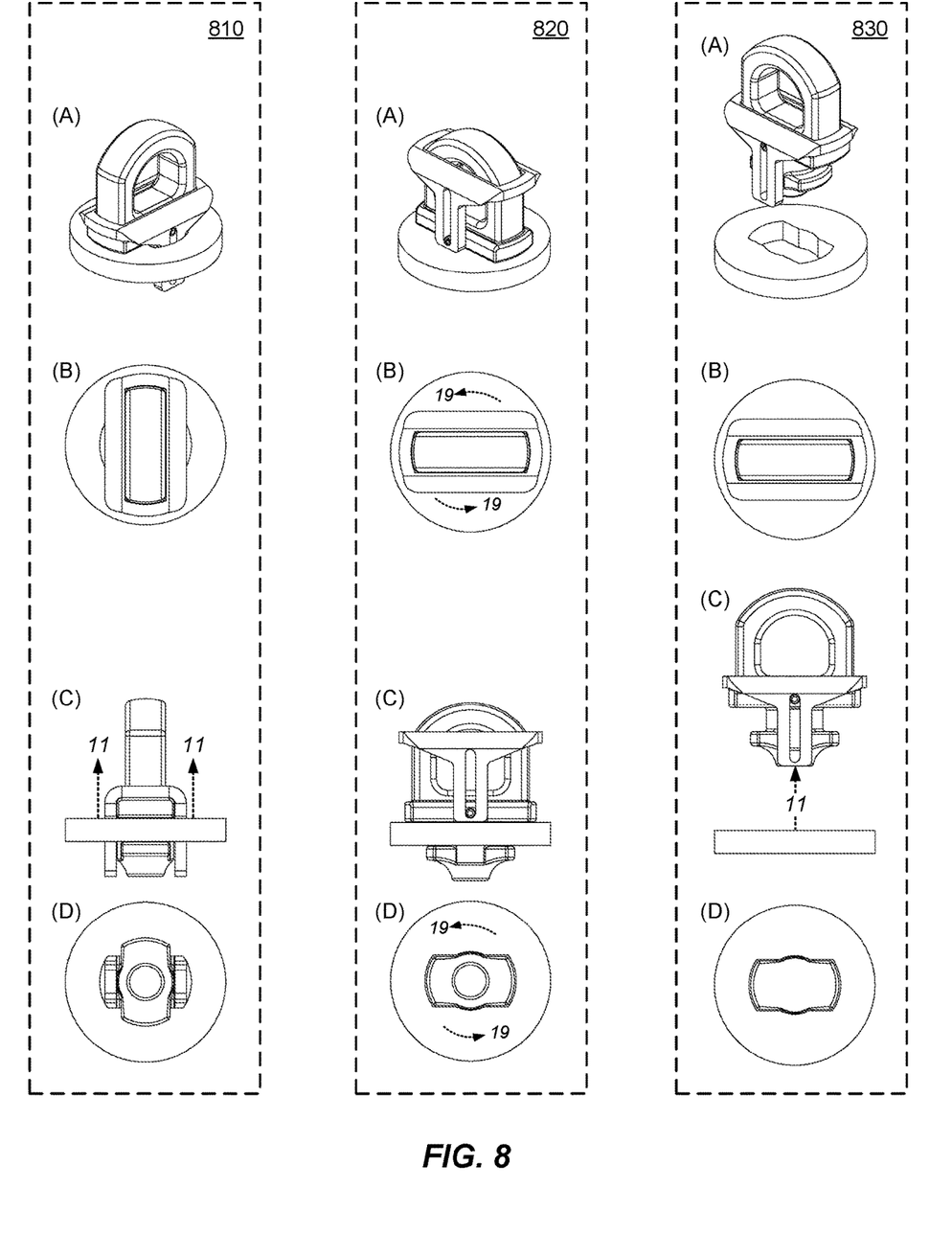
FIG. 8 illustrates aspects of a method for removing the tie-down anchor from the receiver of FIG. 5.

FIG. 8 illustrates aspects of a method for removing the tie-down anchor 50 (or safety-chain anchor) from the receiver 66. FIG. 8 shows multiple views of the tie-down anchor 50 and receiver 66, which illustrate the various orientations of the tie-down anchor 50 used to remove the tie-down anchor 50 from the receiver 66. Specifically, FIG. 8(A) is a perspective view of the tie-down anchor 50 and receiver 66. FIG. 8(B) is a top view of the tie-down anchor 50 and receiver 66. FIG. 8(C) is a side view of the tie-down anchor 50 and receiver 66. FIG. 8(D) is a bottom view of the tie-down anchor 50 and receiver 66.

With continuing reference to FIGS. 5 and 6, removing the tie-down anchor 50 from the receiver 66 may include the method steps illustrated in FIG. 8. The method may begin by uncoupling a safety chain (not shown) from the coupling member 76 of the body member 52. Uncoupling the safety chain from the tie-down anchor 50 un-obstructs the locking member 54 from moving in an upward direction 11 that allows the locking member 54 to be disengaged with the elongated slot 80 of the receiver 66, which allows the body member 52 to be rotated in a second direction 19 to an unlatched orientation.

Accordingly, after uncoupling the safety chain, the tie-down anchor 50 can be removed from the receiver 66 by first lifting the locking member 54 in an upward direction 11, as shown in FIG. 8-810(C). When the locking member 54 is lifted in the upward direction 11, the leg(s) 62 of the locking member 54 disengage from the elongate slot 80 of the receiver 66 and exit the elongated slot 80, as shown in FIG. 8-820(C). At this point the locking member 54 is in the interference position the that obstructs a portion of the aperture 72 and the leg(s) 62 of the locking member 54 are free from the elongated slot 80, as shown in FIG. 8-820(C), which allows the body member 52 to be rotated in the second direction 19 to the unlatched orientation, as shown in FIG. 8-820(B).

The body member 52 can be rotated in the second direction 19 to the unlatched orientation shown in FIG. 8-830(B), which orients the length of the enlarged head 38 of the latching member 64 to be in alignment with a length of the elongated slot 80, allowing the enlarged head 38 to pass through the elongate slot 80 of the receiver 66 when the tie-down anchor 50 is lifted in an upward direction 11 relative to the receiver 66, as shown in FIG. 8-830(C), thereby removing the tie-down anchor 50 from the receiver 66.

Examples

The following examples pertain to specific invention embodiments and point out specific features, elements, or steps that can be used or otherwise combined in achieving such embodiments.

In one example there is provided, a safety-chain anchor apparatus removably securable within a receiver, comprising:
  a body member having an aperture and a latching member operable to be inserted into an elongate slot of the receiver, wherein when inserted into the elongate slot of the receiver, rotating the body member in a first direction perpendicular to the receiver rotates the latching member to a latched orientation that is at least partially out of axial alignment with the elongate slot of the receiver, and rotating the body member in a second direction perpendicular to the receiver rotates the latching member to an unlatched orientation that is in axial alignment with the elongate slot of the receiver; and
  a locking member movably coupled to an outside portion of the body member that allows the locking member to be in: an interference position that obstructs a portion of the aperture when the latching member is in the unlatched orientation, and an unobstructed position that substantially exposes the aperture when the latching member is in the latched orientation.

In one example of the safety-chain anchor apparatus, inserting the latching member into the elongate slot of the receiver engages at least one leg of the locking member with a top surface of the receiver and causes the locking member to move in an upward direction placing the locking member in the interference position that obstructs the portion of the aperture.

In one example of the safety-chain anchor apparatus, when the latching member is inserted in the elongate slot of the receiver, rotating the body member in the first direction to the latched orientation allows at least one leg of the locking member to fall vertically into the elongate slot of the receiver, causing the locking member to fall by gravity in a downward direction into the unobstructed position that substantially exposes the aperture of the body member.

In one example of the safety-chain anchor apparatus, placing the locking member into the unobstructed position engages the at least one leg of the locking member with the elongate slot of the receiver, locking the latching member into the receiver and preventing rotation of the body member in the second direction to the unlatched orientation.

In one example of the safety-chain anchor apparatus, coupling a safety chain to the aperture of the body member when the locking member is in the unobstructed position that substantially exposes the aperture of the body member blocks the locking member from moving in an upward direction that would place the locking member in the interference position and prevents rotation of the body member in the second direction to the unlatched orientation.

In one example of the safety-chain anchor apparatus, when the locking member is in the unobstructed position and the aperture is free from obstruction, lifting the locking member in an upward direction disengages the locking member from the elongate slot of the receiver to allow the body member to be rotated in the second direction to the unlatched orientation.

In one example of the safety-chain anchor apparatus, the locking member further comprises an arch structure that is pivotally coupled to a post of the body member (e.g., a neck of the latching member) to allow the body member to rotate within the arch structure in an axial direction along an axis of the post.

In one example of the safety-chain anchor apparatus, inserting the latching member into the elongate slot of the receiver comprises orienting the body member within the arch structure of the locking member such that: the aperture of the body member is out of axial alignment with the arch structure of the locking member, and at least one leg of the locking member is in axial alignment with the latching member of the body member.

In one example of the safety-chain anchor apparatus, inserting the latching member into the elongate slot of the receiver engages the at least one leg of the locking member with the elongate slot of the receiver and fixes a position of the locking member relative to the elongate slot while allowing the body member to rotate within both the arch structure of the locking member and the elongate slot of the receiver.

In one example of the safety-chain anchor apparatus, placing the latching member in the latched orientation comprises, rotating the body member within the arch structure of the locking member in the first direction to align the aperture of the body member with an opening of the arch structure of the locking member so that the aperture is substantially unobstructed by the arch structure of the locking member.

In one example of the safety-chain anchor apparatus, the body member further comprises a stop-tab extending horizontally from the body member that, when in the latched orientation, engages the arch structure of the locking member and prevents further rotation of the body member in the first direction.

In one example of the safety-chain anchor apparatus, when in the latched orientation, coupling a safety chain to the safety-chain anchor apparatus comprises coupling the safety chain through the aperture of the body member to encircle both the locking member and the body member, thereby locking the body member to the locking member and preventing the body member from rotating in the second direction to the unlatched orientation.

In one example of the safety-chain anchor apparatus, uncoupling the safety chain from the safety-chain anchor apparatus unlocks the locking member from the body member and allows the body member to be rotated in the second direction to the unlatched orientation.

In another example, there is provided a safety-chain anchor apparatus, comprising:
  a body member having an aperture and a latching member capable of being inserted into an elongate slot of a receiver, wherein when inserted into the elongate slot of the receiver, rotating the body member in a first direction perpendicular to the receiver rotates the latching member to a latched orientation that is at least partially out of axial alignment with the elongate slot of the receiver, and rotating the body member in a second direction perpendicular to the receiver rotates the latching member to an unlatched orientation that is in axial alignment with the elongate slot of the receiver; and
  a locking member movably coupled to an upper rim of the body member that allows the locking member to vertically move between: an interference position that obstructs a portion of the aperture when the latching member is in the unlatched orientation, and an unobstructed position that substantially exposes the aperture when the latching member is in the latched orientation.

In one example of the safety-chain anchor apparatus, inserting the latching member into the elongated slot of the receiver engages at least one leg of the locking member with a top surface of the receiver and causes the locking member to move in an upward direction placing the locking member in the interference position that obstructs the portion of the aperture.

In one example of the safety-chain anchor apparatus, when the latching member is inserted in the elongate slot of the receiver, rotating the body member in the first direction to the latched orientation allows at least one leg of the locking member to fall vertically by gravity into the elongate slot of the receiver causing the locking member to fall in a downward direction into the unobstructed position that substantially exposes the aperture of the body member.

In one example of the safety-chain anchor apparatus, placing the locking member into the unobstructed position engages the at least one leg of the locking member with the elongate slot of the receiver, locking the latching member into the receiver and preventing rotation of the body member in the second direction to the unlatched orientation.

In one example of the safety-chain anchor apparatus, coupling a safety chain to the aperture of the body member when the locking member is in the unobstructed position that substantially exposes the aperture of the body member blocks the locking member from moving in an upward direction that would place the locking member in the interference position and prevents rotation of the body member in the second direction to the unlatched orientation.

In one example of the safety-chain anchor apparatus, when the locking member is in the unobstructed position and the aperture is free from obstruction, lifting the locking member in an upward direction disengages the locking member from the elongate slot of the receiver to allow the body member to be rotated in the second direction to the unlatched orientation.

In yet another example, there is provided a safety-chain anchor apparatus, comprising:
  a body member having an aperture and a latching member capable of being inserted into an elongate slot of a receiver, wherein when inserted into the elongate slot of the receiver, rotating the body member in a first direction perpendicular to the receiver rotates the latching member to a latched orientation that is at least partially out of axial alignment with the elongate slot of the receiver, and rotating the body member in a second direction perpendicular to the receiver rotates the latching member to an unlatched orientation that is in axial alignment with the elongate slot of the receiver; and
  a locking member pivotally coupled to a post of the body member to allow the body member to rotate within an arch structure of the locking member in an axial direction along an axis of the post allowing the locking member to be in: an interference position that obstructs a portion of the aperture when the latching member is in the unlatched orientation, and an unobstructed position that substantially exposes the aperture when the latching member is in the latched orientation.

In one example of the safety-chain anchor apparatus, inserting the latching member into the elongate slot of the receiver comprises orienting the body member within the arch structure of the locking member such that: the aperture of the body member is out of axial alignment with the arch structure of the locking member, and at least one leg of the locking member is in axial alignment with the latching member of the body member.

In one example of the safety-chain anchor apparatus, inserting the latching member into the elongate slot of the receiver engages the at least one leg of the locking member with the elongate slot of the receiver and fixes a position of the locking member relative to the elongate slot while allowing the body member to rotate within both the arch structure of the locking member and the elongate slot of the receiver.

In one example of the safety-chain anchor apparatus, placing the latching member in the latched orientation comprises, rotating the body member within the arch structure of the locking member in the first direction to align the aperture of the body member with an opening of the arch structure of the locking member so that the aperture is substantially unobstructed by the arch structure.

In one example of the safety-chain anchor apparatus, the body member further comprises a stop-tab extending horizontally from the body member that, when in the latched orientation, engages the arch structure of the locking member and prevents further rotation of the body member in the first direction.

In one example of the safety-chain anchor apparatus, when in the latched orientation, coupling a safety chain to the safety-chain anchor apparatus comprises coupling the safety chain through the aperture of the body member to encircle both the locking member and the body member, thereby locking the body member to the locking member and preventing the body member from rotating in the second direction to the unlatched orientation.

In one example of the safety-chain anchor apparatus, uncoupling the safety chain from the safety-chain anchor apparatus unlocks the locking member from the body member and allows the body member to be rotated in the second direction to the unlatched orientation.

In one example, there is provided a method for securing a safety-chain anchor to a receiver, comprising:
  inserting a latching member of the safety-chain anchor into an elongated slot of the receiver; and
  rotating a body member of the safety-chain anchor in a first direction perpendicular to the receiver to a latched orientation that is at least partially out of axial alignment with the elongate slot of the receiver,
  wherein rotating the body member in the first direction causes a locking member movably coupled to an outside portion of the body member to be in an unobstructed position that substantially exposes an aperture in the body member and allows a safety chain to be coupled to the body member through the aperture.

In one example, there is provided a method for removing a safety-chain anchor from a receiver, comprising:
- uncoupling a safety chain from a body member of the safety-chain anchor;
- rotating the body member of the safety-chain anchor in a second direction perpendicular to the receiver to an unlatched orientation that is in axial alignment with an elongate slot of the receiver,
- wherein rotating the body member in the second direction causes a locking member movably coupled to an outside portion of the body member to be in an interference position that obstructs a portion of the aperture; and
- lifting the safety-chain anchor in an upward direction perpendicular to the receiver to remove a latching member of the safety-chain anchor from an elongated slot of the receiver.

Of course, it is to be understood that the above-described arrangements and methods are only illustrative of the application of the principles of the present invention. Numerous modifications and alternative arrangements and methods may be devised by those skilled in the art without departing from the spirit and scope of the present invention, and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, and manner of operation, assembly, and use may be made without departing from the principles and concepts set forth herein.

What is claimed is:

1. A safety-chain anchor apparatus removably securable within a receiver, comprising:
   a body member having an aperture and a latching member operable to be inserted into an elongate slot of the receiver, wherein when inserted into the elongate slot of the receiver, rotating the body member in a first direction perpendicular to the receiver rotates the latching member to a latched orientation that is at least partially out of axial alignment with the elongate slot of the receiver, and rotating the body member in a second direction perpendicular to the receiver rotates the latching member to an unlatched orientation that is in axial alignment with the elongate slot of the receiver; and
   a locking member movably coupled to an outside portion of the body member that allows the locking member to be in: an interference position that obstructs a portion of the aperture when the latching member is in the unlatched orientation, and an unobstructed position that substantially exposes the aperture when the latching member is in the latched orientation;
   wherein either:
   inserting the latching member into the elongate slot of the receiver engages at least one leg of the locking member with a top surface of the receiver and causes the locking member to move in an upward direction placing the locking member in the interference position that obstructs the portion of the aperture; or
   the locking member comprises an arch structure that is pivotally coupled to a post of the body member to allow the body member to rotate within the arch structure in an axial direction along an axis of the post.

2. The safety-chain anchor apparatus in claim 1, wherein, when the latching member is inserted in the elongate slot of the receiver, rotating the body member in the first direction to the latched orientation allows at least one leg of the locking member to fall vertically into the elongate slot of the receiver, causing the locking member to fall by gravity in a downward direction into the unobstructed position that substantially exposes the aperture of the body member.

3. The safety-chain anchor apparatus in claim 2, wherein placing the locking member into the unobstructed position engages the at least one leg of the locking member with the elongate slot of the receiver, locking the latching member into the receiver and preventing rotation of the body member in the second direction to the unlatched orientation.

4. The safety-chain anchor apparatus in claim 1, wherein, coupling a safety chain to the aperture of the body member when the locking member is in the unobstructed position that substantially exposes the aperture of the body member blocks the locking member from moving in an upward direction that would place the locking member in the interference position and prevents rotation of the body member in the second direction to the unlatched orientation.

5. The safety-chain anchor apparatus in claim 1, wherein, when the locking member is in the unobstructed position and the aperture is free from obstruction, lifting the locking member in an upward direction disengages the locking member from the elongate slot of the receiver to allow the body member to be rotated in the second direction to the unlatched orientation.

6. The safety-chain anchor apparatus in claim 1, wherein inserting the latching member into the elongate slot of the receiver comprises orienting the body member within the arch structure of the locking member such that: the aperture of the body member is out of axial alignment with the arch structure of the locking member, and at least one leg of the locking member is in axial alignment with the latching member of the body member.

7. The safety-chain anchor apparatus in claim 6, wherein inserting the latching member into the elongate slot of the receiver engages the at least one leg of the locking member with the elongate slot of the receiver and fixes a position of the locking member relative to the elongate slot while allowing the body member to rotate within both the arch structure of the locking member and the elongate slot of the receiver.

8. The safety-chain anchor apparatus in claim 1, wherein placing the latching member in the latched orientation comprises, rotating the body member within the arch structure of the locking member in the first direction to align the aperture of the body member with an opening of the arch structure of the locking member so that the aperture is substantially unobstructed by the arch structure of the locking member.

9. The safety-chain anchor apparatus in claim 1, wherein the body member further comprises a stop-tab extending horizontally from the body member that, when in the latched orientation, engages the arch structure of the locking member and prevents further rotation of the body member in the first direction.

10. The safety-chain anchor apparatus in claim 1, wherein, when in the latched orientation, coupling a safety chain to the safety-chain anchor apparatus comprises coupling the safety chain through the aperture of the body member to encircle both the locking member and the body member, thereby locking the body member to the locking member and preventing the body member from rotating in the second direction to the unlatched orientation.

11. The safety-chain anchor apparatus in claim 10, wherein, uncoupling the safety chain from the safety-chain anchor apparatus unlocks the locking member from the body member and allows the body member to be rotated in the second direction to the unlatched orientation.

12. A safety-chain anchor apparatus, comprising:
a body member having an aperture and a latching member capable of being inserted into an elongate slot of a receiver, wherein when inserted into the elongate slot of the receiver, rotating the body member in a first direction perpendicular to the receiver rotates the latching member to a latched orientation that is at least partially out of axial alignment with the elongate slot of the receiver, and rotating the body member in a second direction perpendicular to the receiver rotates the latching member to an unlatched orientation that is in axial alignment with the elongate slot of the receiver; and
a locking member movably coupled to an upper rim of the body member that allows the locking member to vertically move between: an interference position that obstructs a portion of the aperture when the latching member is in the unlatched orientation, and an unobstructed position that substantially exposes the aperture when the latching member is in the latched orientation;
wherein, coupling a safety chain to the aperture of the body member when the locking member is in the unobstructed position that substantially exposes the aperture of the body member blocks the locking member from moving in an upward direction that would place the locking member in the interference position and prevents rotation of the body member in the second direction to the unlatched orientation.

13. The safety-chain anchor apparatus in claim 12, wherein inserting the latching member into the elongated slot of the receiver engages at least one leg of the locking member with a top surface of the receiver and causes the locking member to move in an upward direction placing the locking member in the interference position that obstructs the portion of the aperture.

14. The safety-chain anchor apparatus in claim 12, wherein, when the latching member is inserted in the elongate slot of the receiver, rotating the body member in the first direction to the latched orientation allows at least one leg of the locking member to fall vertically by gravity into the elongate slot of the receiver causing the locking member to fall in a downward direction into the unobstructed position that substantially exposes the aperture of the body member.

15. The safety-chain anchor apparatus in claim 14, wherein placing the locking member into the unobstructed position engages the at least one leg of the locking member with the elongate slot of the receiver, locking the latching member into the receiver and preventing rotation of the body member in the second direction to the unlatched orientation.

16. The safety-chain anchor apparatus in claim 12, wherein, when the locking member is in the unobstructed position and the aperture is free from obstruction, lifting the locking member in an upward direction disengages the locking member from the elongate slot of the receiver to allow the body member to be rotated in the second direction to the unlatched orientation.

17. A safety-chain anchor apparatus, comprising:
a body member having an aperture and a latching member capable of being inserted into an elongate slot of a receiver, wherein when inserted into the elongate slot of the receiver, rotating the body member in a first direction perpendicular to the receiver rotates the latching member to a latched orientation that is at least partially out of axial alignment with the elongate slot of the receiver, and rotating the body member in a second direction perpendicular to the receiver rotates the latching member to an unlatched orientation that is in axial alignment with the elongate slot of the receiver; and
a locking member pivotally coupled to a post of the body member to allow the body member to rotate within an arch structure of the locking member in an axial direction along an axis of the post allowing the locking member to be in: an interference position that obstructs a portion of the aperture when the latching member is in the unlatched orientation, and an unobstructed position that substantially exposes the aperture when the latching member is in the latched orientation.

18. The safety-chain anchor apparatus in claim 17, wherein inserting the latching member into the elongate slot of the receiver comprises orienting the body member within the arch structure of the locking member such that: the aperture of the body member is out of axial alignment with the arch structure of the locking member, and at least one leg of the locking member is in axial alignment with the latching member of the body member.

19. The safety-chain anchor apparatus in claim 18, wherein inserting the latching member into the elongate slot of the receiver engages the at least one leg of the locking member with the elongate slot of the receiver and fixes a position of the locking member relative to the elongate slot while allowing the body member to rotate within both the arch structure of the locking member and the elongate slot of the receiver.

20. The safety-chain anchor apparatus in claim 17, wherein placing the latching member in the latched orientation comprises, rotating the body member within the arch structure of the locking member in the first direction to align the aperture of the body member with an opening of the arch structure of the locking member so that the aperture is substantially unobstructed by the arch structure.

21. The safety-chain anchor apparatus in claim 17, wherein the body member further comprises a stop-tab extending horizontally from the body member that, when in the latched orientation, engages the arch structure of the locking member and prevents further rotation of the body member in the first direction.

22. The safety-chain anchor apparatus in claim 17, wherein, when in the latched orientation, coupling a safety chain to the safety-chain anchor apparatus comprises coupling the safety chain through the aperture of the body member to encircle both the locking member and the body member, thereby locking the body member to the locking member and preventing the body member from rotating in the second direction to the unlatched orientation.

23. The safety-chain anchor apparatus in claim 22, wherein, uncoupling the safety chain from the safety-chain anchor apparatus unlocks the locking member from the body member and allows the body member to be rotated in the second direction to the unlatched orientation.

* * * * *